(12) United States Patent
Li et al.

(10) Patent No.: US 11,297,559 B2
(45) Date of Patent: Apr. 5, 2022

(54) COMMUNICATION METHOD AND DEVICE

(71) Applicant: HUAWEI TECHNOLOGIES CO., LTD., Guangdong (CN)

(72) Inventors: Junchao Li, Shanghai (CN); Hao Tang, Shanghai (CN); Fan Wang, Berkshire (GB); Zhenfei Tang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 122 days.

(21) Appl. No.: 16/713,718

(22) Filed: Dec. 13, 2019

(65) Prior Publication Data

US 2020/0120581 A1 Apr. 16, 2020

Related U.S. Application Data

(63) Continuation of application No. PCT/CN2018/091347, filed on Jun. 14, 2018.

(30) Foreign Application Priority Data

Jun. 16, 2017 (CN) .......................... 201710456234.0

(51) Int. Cl.
*H04W 48/12* (2009.01)
*H04L 5/00* (2006.01)
(Continued)

(52) U.S. Cl.
CPC ........... *H04W 48/12* (2013.01); *H04L 5/0053* (2013.01); *H04W 52/0212* (2013.01); *H04W 72/042* (2013.01)

(58) Field of Classification Search
CPC . H04W 52/02; H04W 48/12; H04W 52/0229; H04W 72/042; H04W 52/0212;
(Continued)

(56) References Cited

U.S. PATENT DOCUMENTS

2011/0070845 A1 3/2011 Chen et al.
2012/0201216 A1 8/2012 Wu
(Continued)

FOREIGN PATENT DOCUMENTS

CN 102056198 A 5/2011
CN 106233805 A 12/2016
(Continued)

OTHER PUBLICATIONS

MATLAB & Simulink, "PDCCH Blind Search and DCI Decoding," Apr. 2, 2010, https://www.mathworks.com/help/lte/ug/pdcch-blind-search-and-dci-decoding.html (Year: 2010).*
(Continued)

*Primary Examiner* — Maharishi V Khirodhar
*Assistant Examiner* — Kenneth P Hunt

(57) ABSTRACT

A communication method and a device are provided, to reduce power consumption of a terminal device and reduce system overheads. A communication method can include, at least, determining, by a terminal device, that a plurality of BPs are activated, where the plurality of BPs are in a same carrier, the plurality of BPs include a first BP and a second BP, a first CSS is configured in the first BP, and common DCI is configured in the first CSS. The communication method can further include detecting, by the terminal device, the common DCI only in a second CSS when the second CSS is configured in the second BP, where the common DCI is configured in the second CSS.

16 Claims, 6 Drawing Sheets

(51) Int. Cl.
*H04W 52/02* (2009.01)
*H04W 72/04* (2009.01)

(58) Field of Classification Search
CPC .... H04W 52/0216; H04L 5/0053; H04L 5/00; Y02D 30/70
See application file for complete search history.

(56) References Cited

U.S. PATENT DOCUMENTS

| | | | |
|---|---|---|---|
| 2013/0155969 A1 | 6/2013 | Moon et al. | |
| 2016/0353421 A1 | 12/2016 | Liao et al. | |
| 2017/0055242 A1 | 2/2017 | Kusashima et al. | |
| 2017/0318563 A1* | 11/2017 | Yang | H04L 5/0053 |
| 2018/0049169 A1* | 2/2018 | Lin | H04W 72/042 |
| 2020/0145961 A1* | 5/2020 | Harada | H04W 72/044 |
| 2020/0288482 A1* | 9/2020 | Yi | H04W 72/1289 |
| 2021/0250920 A1* | 8/2021 | Kim | H04W 72/0453 |

FOREIGN PATENT DOCUMENTS

| | | |
|---|---|---|
| WO | 2016/115654 A | 7/2016 |
| WO | 2016115654 A1 | 7/2016 |

OTHER PUBLICATIONS

Rong-Hui Peng, "LTE PHY layer overview," Jan. 27, 2009, https://my.ece.utah.edu/~peng/LTE%20PHY%20layer%20overview2.pdf (Year: 2009).*
Keysight, "System Information Block (SIB) Transmission Setup," Mar. 18, 2011 https://rfmw.em.keysight.com/wireless/helpfiles/n7624/Content/Main/System%20Information%20Block%20(SIB)%20Transmission%20Setup.htm (Year: 2011).*
Pradeep Prabhu, "What is SIB in LTE?" May 16, 2017 https://ltebasics.wordpress.com/2017/05/16/what-is-sib-in-lte/ (Year: 2018).*
India Examination Report dated May 18, 2021 in Application No. 201937054494, 7 pages.
3GPP TSG RAN WG1 Meeting #89,R1-1707627, "Discussion on CSS configuration for wideband operation", LG Electronics, Hangzhou, China, May 15-19, 2017,total 8 pages.
Panasonic: "NR synchronization signal and DL broadcast signal", 3GPP Draft; R1-1609701, Sep. 30, 2016 (Sep. 30, 2016), XP051158568, total 4 pages.
LG Electronics,"Discussion on Resource Allocation", 3GPP TSG RAN WG1 Meeting #89, R1-1707652, Hangzhou, P.R. China, May 15-19, 2017, total 6 pages.
MCC Support, "Final Report of 3GPP TSG RAN WG1 #88 v1.0.0 (Athens, Greece, Feb. 13-17, 2017)", 3GPP TSG RAN WG1 Meeting #88bis, R1-1704172,Spokane, USA, Apr. 3-7, 2017, total 153 pages.
3GPP TSG RAN WG1 Meeting #89,R1-1709265,:"WF on bandwidth part configuration",OPPO, Ericsson,Hangzhou, P.R. China, May 15-19, 2017, total 5 pages.
Anonymous: "MCC Support, Final Report",BGPP TSG RAN WG1 Meeting #88815 V1.0.0,R1-1704172, Apr. 2, 2017 (Apr. 2, 2017), XP055529173, total 152 pages.
MediaTek Inc.,"Efficient Wider Bandwidth Operations for NR", 3GPP TSG RAN WG1 Meeting #89, R1-1707828, Hangzhou, China, May 15-19, 2017, total 7 pages.
MCC Support,"Final Report of 3GPP TSG RAN WG1 #88bis v1.0.0 (Spokane, USA, Apr. 3-7, 2017)",3GPP TSG RAN WG1 Meeting #89, R1-1708890,Hangzhou, China, May 15-19, 2017, total 154 pages.
Guangdong OPPO Mobile Telecom: "DL resource allocation and indication for NR", 3GPP Draft R1-1701960, Feb. 12, 2017 (Feb. 12, 2017), XP051209122, total 4 pages.
MCC Support,"Final Report of 3GPP TSG RAN WG1 #89 v1.0.0 (Hangzhou, China, May 15-19, 2017)", 3GPP TSG RAN WG1 Meeting #90, R1-1712031, Prague, Czech Rep, Aug. 21-25, 2017, total 165 pages.
International Search Report issued in PCT/CN2018/091347 dated Aug. 27, 2018 (4 pages).

* cited by examiner

COMMUNICATION METHOD AND DEVICE

CROSS-REFERENCE TO RELATED APPLICATIONS

This application is a continuation of International Application No. PCT/CN2018/091347, filed on Jun. 14, 2018, which claims priority to Chinese Patent Application No. 201710456234.0, filed on Jun. 16, 2017. The disclosures of the aforementioned applications are hereby incorporated by reference in their entireties.

TECHNICAL FIELD

Embodiments of the present application relate to the field of communications technologies, and in particular, to a communication method and a device.

BACKGROUND

During standardization of the 5th mobile communications (the 5th Generation, 5G) new radio (NR), a case in which a bandwidth capability of a terminal device is less than a system bandwidth is supported. At the radio access network (RAN) 1 #88 meeting, use of a two-step resource allocation manner to support data transmission of a terminal device whose bandwidth capability is less than a system bandwidth has been discussed and approved. To be specific, a bandwidth part is first indicated to the terminal device, and then resource allocation and data transmission are performed on the bandwidth part. At the RAN1 #88b meeting, it has been further specified that for a carrier, a network may semi-statically configure one or more bandwidth parts for a terminal device, where a bandwidth of each bandwidth part is not greater than a maximum bandwidth capability of the terminal device. The maximum bandwidth capability of the terminal device is a terminal device capability, and refers to a maximum transmission bandwidth that can be supported by the terminal device. The terminal device reports the maximum bandwidth capability of the terminal device by using a preamble or a message 3 during initial access or by using higher layer signaling.

When a plurality of bandwidth parts are configured for a terminal device, how to reduce power consumption of the terminal device is an urgent problem that needs to be resolved.

SUMMARY

Embodiments of the present application provide, at least, a communication method and a device, to reduce power consumption of a terminal device and reduce system overheads, among other aspects.

According to a first aspect, a communication method is provided. The method may be performed by a terminal device. The method includes: determining, by a terminal device, that a plurality of bandwidth parts (BP) are activated, where the plurality of BPs are in a same carrier, the plurality of BPs include a first BP and a second BP, a first common search space (CSS) is configured in the first BP, and common downlink control information (DCI) is configured in the first CSS; and detecting, by the terminal device, the common DCI only in a second CSS when the second CSS is configured in the second BP, where the common DCI is configured in the second CSS.

According to a second aspect, a communication method is provided. The method may be performed by a network device. The network device is, for example, a base station (BS). The method includes: configuring and activating, by a network device, a plurality of BPs for a terminal device, where the plurality of BPs are in a same carrier, the plurality of BPs include a first BP and a second BP, a first CSS is configured in the first BP, and common DCI is configured in the first CSS; and sending, by the network device, first indication information to the terminal device when the network device configures a second CSS for the second BP, where the first indication information is used to instruct the terminal device to detect the common DCI only in the second CSS, and the common DCI is configured in the second CSS.

In the embodiments of the present application, when the plurality of BPs configured for the terminal device are activated, if the second CSS is configured in the second BP, and the common DCI is configured in the second CSS, the terminal device can directly detect the common DCI in the second CSS, with no need to detect the common DCI in a CSS configured on another BP. This can avoid an increase in the quantity of blind detections of the terminal device and an increase in power consumption of the terminal device.

In a possible design, when a CSS is not configured on other BPs than the first BP in the plurality of BPs, the terminal device detects the common DCI in the first CSS, and receives a measurement reference signal in the second BP. Correspondingly, when a CSS is not configured on other BPs than the first BP in the plurality of BPs, the network device sends second indication information to the terminal device, where the second indication information is used to instruct the terminal device to receive a measurement reference signal in the second BP.

The terminal device may receive the measurement reference signal in the second BP, with no need to receive a measurement reference signal in the first BP, thereby minimizing a quantity of blind detections of the terminal device and reducing power consumption of the terminal device.

In a possible design, when the second CSS is configured in the second BP, the terminal device receives first indication information sent by a network device, where the first indication information is used to instruct the terminal device to detect the common DCI in the second CSS.

The network device may instruct, by using the first indication information, the terminal device to detect the common DCI in the second CSS. This manner is relatively simple, and the terminal device can know, in a timely manner, a place to detect the common DCI.

In a possible design, when the second CSS is configured in the second BP, the terminal device receives a measurement reference signal in the second BP. Correspondingly, when the second CSS is configured in the second BP, the network device sends third indication information to the terminal device, where the third indication information is used to instruct the terminal device to receive a measurement reference signal in the second BP.

If the second CSS is configured in the second BP, the terminal device may receive the measurement reference signal in the second BP, with no need to receive a measurement reference signal in the first BP, thereby avoiding an increase in a quantity of times that the terminal device blindly detects a measurement reference signal. In addition, the network device may instruct, by using the third indication information, the terminal device to receive the measurement reference signal in the second BP, so that the terminal device knows, in a timely manner, a place to receive the measurement reference signal.

In a possible design, the terminal device receives a master information block (MIB) sent by the network device, and determines, based on the MIB, the first BP configured by the network device for the terminal device. Alternatively, the terminal device determines, based on predefined information, the first BP configured by the network device for the terminal device. Correspondingly, the network device sends a MIB to the terminal device, where the MIB is used to determine the first BP configured by the network device for the terminal device. Alternatively, the network device configures the first BP for the terminal device based on predefined information.

In this case, the first BP may be a BP allocated by the network device to the terminal device during initial access of the terminal device. That is, a time point for allocating the first BP is provided. For example, the network device may send the MIB to the terminal device. After receiving the MIB, the terminal device may determine, based on the MIB, the first BP allocated by the network device to the terminal device. Alternatively, the terminal device may learn, based on the predefined information, the first BP allocated by the network device to the terminal device. For example, the terminal device determines a frequency domain resource of a synchronization signal through synchronization signal blind detection, and then determines a frequency domain resource of the first BP based on a predefined relationship. If the first BP is a BP allocated by the network device to the terminal device during initial access of the terminal device, the first BP may be activated by default.

In a possible design, the terminal device receives a system information block (SIB) sent by the network device, and determines, based on the SIB, the first BP or the second BP configured by the network device for the terminal device; or the terminal device receives radio resource control (RRC) signaling sent by the network device, and determines, based on the RRC signaling, the first BP or the second BP configured by the network device for the terminal device. Correspondingly, the network device sends a SIB to the terminal device, where the SIB is used to determine the first BP or the second BP configured by the network device for the terminal device; or the network device sends RRC signaling to the terminal device, where the RRC signaling is used to determine the first BP or the second BP configured by the network device for the terminal device.

In this case, the first BP may be a BP allocated by the network device to the terminal device after the terminal device accesses a network. That is, another time point for allocating the first BP is provided. In addition, the second BP may also be a BP allocated by the network device to the terminal device after the terminal device accesses the network. The time points for allocating the first BP and the second BP are not limited in the embodiments of the present application.

According to a third aspect, a terminal device is provided. The terminal device is configured to perform the method according to the first aspect or any possible design of the first aspect. Specifically, the terminal device includes a unit configured to perform the method according to the first aspect or any possible design of the first aspect.

According to a fourth aspect, a network device is provided. The network device is configured to perform the method according to the second aspect or any possible design of the second aspect. Specifically, the network device includes a unit configured to perform the method according to the second aspect or any possible design of the second aspect.

According to a fifth aspect, a terminal device is provided. The terminal device includes a transceiver, a processor, and a memory. The transceiver, the processor, and the memory may be connected by using a bus system. The memory is configured to store a program, an instruction, or code. The processor is configured to execute the program, the instruction, or the code in the memory, to complete the method according to the first aspect or any possible design of the first aspect.

According to a sixth aspect, a network device is provided. The network device includes a transceiver, a processor, and a memory. The transceiver, the processor, and the memory may be connected by using a bus system. The memory is configured to store a program, an instruction, or code. The processor is configured to execute the program, the instruction, or the code in the memory, to complete the method according to the second aspect or any possible design of the second aspect.

According to a seventh aspect, a computer-readable storage medium or a computer program product is provided. The computer-readable storage medium or the computer program product is configured to store a computer program. The computer program is used to execute instruction(s) in the method according to the first aspect, the second aspect, any possible design of the first aspect, or any possible design of the second aspect.

According to an eighth aspect, a communications system is provided. The system includes the terminal device according to the third aspect or the fifth aspect and the network device according to the fourth aspect or the sixth aspect.

According to a ninth aspect, a communication method is provided. The method may be performed by a terminal device. The method includes: if the terminal device cannot simultaneously monitor an activated first BP and an activated second BP, where the first BP and the second BP are in a same carrier, and a UE-specific Search Space (USS) is configured in the second BP, detecting, by the terminal device, the USS in the second BP, where specific DCI of the terminal device is configured in the USS, and the specific DCI of the terminal device is used to indicate that the terminal device performs data transmission specific to the terminal device in the second BP.

According to a tenth aspect, a communication method is provided. The method may be performed by a network device. The network device is, for example, a base station. The method includes: configuring and activating, by a network device, a first BP and a second BP for a terminal device, where the first BP and the second BP are in a same carrier, a USS is configured in the second BP, and the first BP and the second BP cannot be simultaneously monitored by the terminal device; and sending, by the network device, specific DCI of the terminal device in the USS in the second BP, where the specific DCI of the terminal device is used to indicate that the terminal device performs data transmission specific to the terminal device in the second BP.

In a possible design, the terminal device detects, within a first transmission time unit, common DCI in a CSS configured in the first BP, and detects the specific DCI of the terminal device in the USS within a second transmission time unit, where the first transmission time unit is different from the second transmission time unit. Correspondingly, the network device sends, within a first transmission time unit, common DCI in a CSS configured in the first BP, and sends the specific DCI of the terminal device in the USS within a second transmission time unit, where the first transmission time unit is different from the second transmission time unit.

In a possible design, the terminal device detects, within the first transmission time unit, the specific DCI of the terminal device in the CSS configured in the first BP. Correspondingly, the network device sends, within the first transmission time unit, the specific DCI of the terminal device in the CSS configured in the first BP.

According to an eleventh aspect, a terminal device is provided. The terminal device may be configured to perform the method according to the ninth aspect or any possible design of the ninth aspect. For example, the terminal device includes a first processing unit and a second processing unit. The first processing unit is configured to determine that an activated first BP and an activated second BP cannot be simultaneously monitored, where the first BP and the second BP are in a same carrier, and a USS is configured in the second BP. The second processing unit is configured to detect the USS in the second BP, where specific downlink control information DCI of the terminal device is configured in the USS, and the specific DCI of the terminal device is used to indicate that the terminal device performs data transmission specific to the terminal device in the second BP.

In a possible design, the second processing unit is further configured to: detect, within a first transmission time unit, common DCI in a CSS configured in the first BP, and detect the specific DCI of the terminal device in the USS within a second transmission time unit, where the first transmission time unit is different from the second transmission time unit.

In a possible design, the second processing unit is further configured to detect, within the first transmission time unit, the specific DCI of the terminal device in the CSS configured in the first BP.

According to a twelfth aspect, a network device is provided. The network device may be configured to perform the method according to the tenth aspect or any possible design of the tenth aspect. The network device includes a processing unit and a transceiver unit. The processing unit is configured to configure and activate a first BP and a second BP for a terminal device, where the first BP and the second BP are in a same carrier, a USS is configured in the second BP, and the first BP and the second BP cannot be simultaneously monitored by the terminal device. The transceiver unit is configured to send specific DCI of the terminal device in the USS in the second BP, where the specific DCI of the terminal device is used to indicate that the terminal device performs data transmission specific to the terminal device in the second BP.

In a possible design, the transceiver unit is further configured to: send, within a first transmission time unit, common DCI in a CSS configured in the first BP, and send the specific DCI of the terminal device in the USS within a second transmission time unit, where the first transmission time unit is different from the second transmission time unit.

In a possible design, the transceiver unit is further configured to send, within the first transmission time unit, the specific DCI of the terminal device in the CSS configured in the first BP.

According to a thirteenth aspect, a terminal device is provided. The terminal device may be configured to perform the method according to the ninth aspect or any possible design of the ninth aspect. The terminal device includes a processor and a transceiver. The processor is configured to: determine that an activated first BP and an activated second BP cannot be simultaneously monitored, where the first BP and the second BP are in a same carrier, and a USS is configured in the second BP; and use the transceiver to detect the USS in the second BP, where specific downlink control information DCI of the terminal device is configured in the USS, and the specific DCI of the terminal device is used to indicate that the terminal device performs data transmission specific to the terminal device in the second BP.

In a possible design, the processor is further configured to use the transceiver to: detect, within a first transmission time unit, common DCI in a CSS configured in the first BP, and detect the specific DCI of the terminal device in the USS within a second transmission time unit, where the first transmission time unit is different from the second transmission time unit.

In a possible design, the processor is further configured to use the transceiver to detect, within the first transmission time unit, the specific DCI of the terminal device in the CSS configured in the first BP.

According to a fourteenth aspect, a network device is provided. The network device may be configured to perform the method according to the tenth aspect or any possible design of the tenth aspect. The network device includes a processor and a transceiver. The processor is configured to use the transceiver to configure and activate a first BP and a second BP for a terminal device, where the first BP and the second BP are in a same carrier, a USS is configured in the second BP, and the first BP and the second BP cannot be simultaneously monitored by the terminal device. The processor is further configured to use the transceiver to send specific DCI of the terminal device in the USS in the second BP, where the specific DCI of the terminal device is used to indicate that the terminal device performs data transmission specific to the terminal device in the second BP.

In a possible design, the processor is further configured to use the transceiver to: send, within a first transmission time unit, common DCI in a CSS configured in the first BP, and send the specific DCI of the terminal device in the USS within a second transmission time unit, where the first transmission time unit is different from the second transmission time unit.

In a possible design, the processor is further configured to use the transceiver to send, within the first transmission time unit, the specific DCI of the terminal device in the CSS configured in the first BP.

According to a fifteenth aspect, a communications system is provided. The system includes the terminal device according to the eleventh aspect or the thirteenth aspect and the network device according to the twelfth aspect or the fourteenth aspect.

According to a sixteenth aspect, a computer-readable storage medium or a computer program product is provided. The computer-readable storage medium or the computer program product is configured to store a computer program. The computer program is used to execute an instruction in the method according to the ninth aspect, the tenth aspect, any possible design of the ninth aspect, or any possible design of the tenth aspect.

DESCRIPTION OF EMBODIMENTS

To make the objectives, technical solutions, and advantages of the embodiments of the present application clearer, the following further describes the embodiments of the present application in detail with reference to the accompanying drawings.

In the following, some terms in the embodiments of the present application are described, to help a person skilled in the art have a better understanding.

(1) A terminal device includes a device that provides a user with voice and/or data connectivity, for example, may include a handheld device with a wireless connection function, or a processing device connected to a wireless modem. The terminal device may communicate with a core network by using a RAN, and exchange voice and/or data with the RAN. The terminal device may include user equipment (UE), a wireless terminal device, a mobile terminal device, a subscriber unit, a subscriber station, a mobile station, a mobile console (Mobile), a remote station, an access point (AP), a remote terminal device (Remote Terminal), an access terminal device (Access Terminal), a user terminal device (User Terminal), a user agent, a user device, or the like. For example, the terminal device may include a mobile phone (or referred to as a "cellular" phone), a computer with a mobile terminal device, a portable, pocket-sized, handheld, computer built-in, or in-vehicle mobile apparatus, or an intelligent wearable device. For example, the terminal device may be a device such as a personal communication service (PCS) phone, a cordless telephone set, a Session Initiation Protocol (SIP) phone, a wireless local loop (WLL) station, a personal digital assistant (PDA), a smartwatch, a smart helmet, smart glasses, or a smart band. The terminal device further includes a limited device, for example, a device with relatively low power consumption, a device with a limited storage capability, or a device with a limited computing capability. For example, the terminal device includes information sensing devices such as a barcode, radio frequency identification (RFID), a sensor, a global positioning system (GPS), and a laser scanner.

Figure 1:
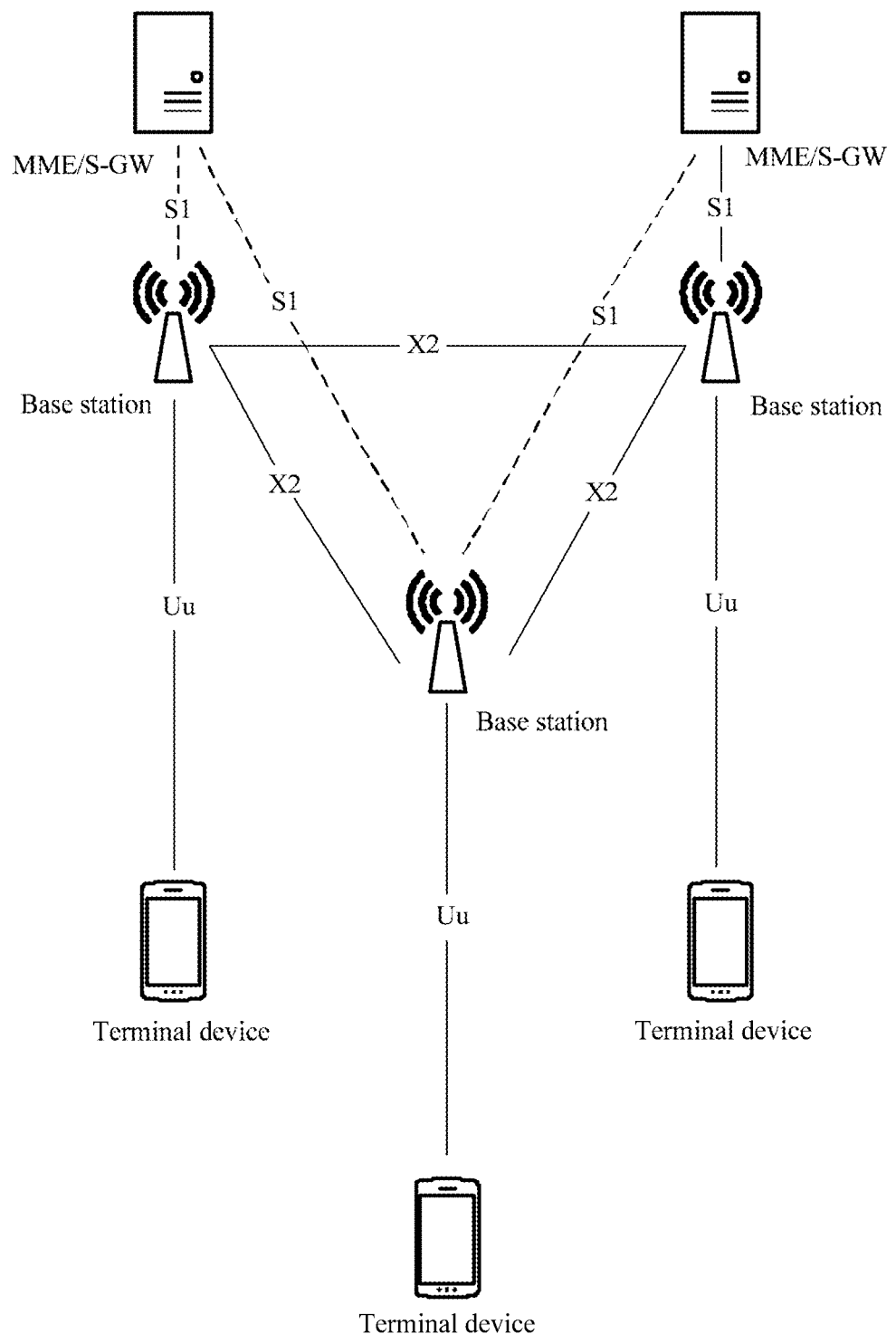
FIG. 1 is a schematic diagram of an application scenario according to an embodiment of the present application.

(2) A network device includes, for example, a base station (for example, an access point), and may be a device that communicates with a wireless terminal device (e.g., by Uu interface as shown in FIG. 1) by using one or more cells over an air interface and that is in an access network. The base station may be configured to mutually convert a received over-the-air frame and an internet protocol (IP) packet and serve as a router between the terminal device and a rest portion of the access network (e.g., by X2 interface as shown in FIG. 1). The rest portion of the access network may include an IP network. The base station is mainly responsible for functions such as radio resource management, quality of service (QoS) management, and data compression and encryption on an air interface side. On a core network side, the base station is mainly responsible for forwarding control plane signaling (e.g., by S1 interface as shown in FIG. 1) to the Mobility Management Entity (MME) and forwarding user plane service data to the Serving GateWay (S-GW). The base station may further coordinate attribute management of an air interface. For example, the base station may include an evolved NodeB (NodeB, eNB, or e-NodeB) in a long term evolution (LTE) system or an LTE-advanced (LTE-A) system, or may include a next-generation NodeB (gNB) in an NR system. This is not limited in the embodiments of the present application.

(3) A bandwidth part is a part of a channel bandwidth, or may be referred to as an "operating bandwidth" or a transmission bandwidth. A mini BP, a BP unit, a BP sub-band, and the like may be referred to as a BP or a BWP. A name and an abbreviation of the bandwidth part are not specifically limited in the embodiments of the present application. A BP may be a segment of continuous resources in frequency domain. For example, one bandwidth part includes K (K>0) consecutive subcarriers, or one bandwidth part is a frequency domain resource on which N (N>0) non-overlapping continuous resource blocks (RB) are located, or one bandwidth part is a frequency domain resource on which M (M>0) non-overlapping continuous resource block groups (RBG) are located, where one RBG includes P (P>0) continuous RBs. One bandwidth part is related to one specific numerology that includes at least one of a subcarrier spacing and a cyclic prefix (CP).

(4) The "numerology (numerology)" in the embodiments of the present application means a series of physical layer parameters for an air interface. During specific implementation, optionally, one BP may correspond to one numerology. The numerology includes a subcarrier spacing, a type of a time unit, a type of CP, or the like. Using the subcarrier spacing as an example, if the terminal device supports subcarrier spacings of 15 kHz and 30 kHz, the base station may allocate a BP with a subcarrier spacing of 15 kHz and a BP with a subcarrier spacing of 30 kHz to the terminal device. The terminal device may switch to a different BP based on a different scenario and service requirement, or may simultaneously transmit data on two or more BPs. When the terminal device supports a plurality of BPs, numerologies corresponding to the BPs may be the same or different.

(5) The terms "system" and "network" may be used interchangeably in the embodiments of the present application. The term "a plurality of" means two or more than two. In view of this, the term "a plurality of" may also be understood as "at least two" in the embodiments of the present application. The term "and/or" describes an association relationship for describing associated objects and represents that three relationships may exist. For example, A and/or B may represent the following three cases: Only A exists, both A and B exist, and only B exists. In addition, the character "/" usually represents an "or" relationship between the associated objects unless specified otherwise.

Unless otherwise stated, in the embodiments of this application, ordinal numbers such as "first" and "second" are intended to distinguish between a plurality of objects, and not intended to limit an order, a time sequence, priorities, or importance of the plurality of objects.

The technical solutions provided in this specification may be applied to a 5G NR system (NR system for short hereinafter) or an LTE system, and may further be applied to a next-generation mobile communications system or another similar mobile communications system.

The following describes an application scenario of the embodiments of the present application. FIG. 1 is a schematic diagram of an application scenario according to an embodiment of the present application, and is also an architectural diagram of an LTE system. Network elements in FIG. 1 include a mobility management entity (MME), a serving gateway (S-GW), a base station, and a terminal device.

MME/S-GW: The MME is a key control node in a 3rd Generation Partnership Project (3GPP) LTE system, is a core-network network element, and is mainly responsible for a signaling processing part, that is, a control plane function, including functions such as access control, mobility management, attachment and detachment, a session management function, and gateway selection. The S-GW is an important network element in a core network in the 3GPP LTE system, and is mainly responsible for a user plane function of user data forwarding, to be specific, routing and forwarding a data packet under control of the MME.

Main network elements in the embodiments of the present application include the base station and the terminal device. The base station configures a bandwidth part for the terminal device, and the terminal device may work on the bandwidth part configured by the base station. For some descriptions of the base station and the terminal device, refer to the foregoing descriptions.

The technical solutions provided in the embodiments of the present application are described below with reference to the accompanying drawings.

Figure 2:
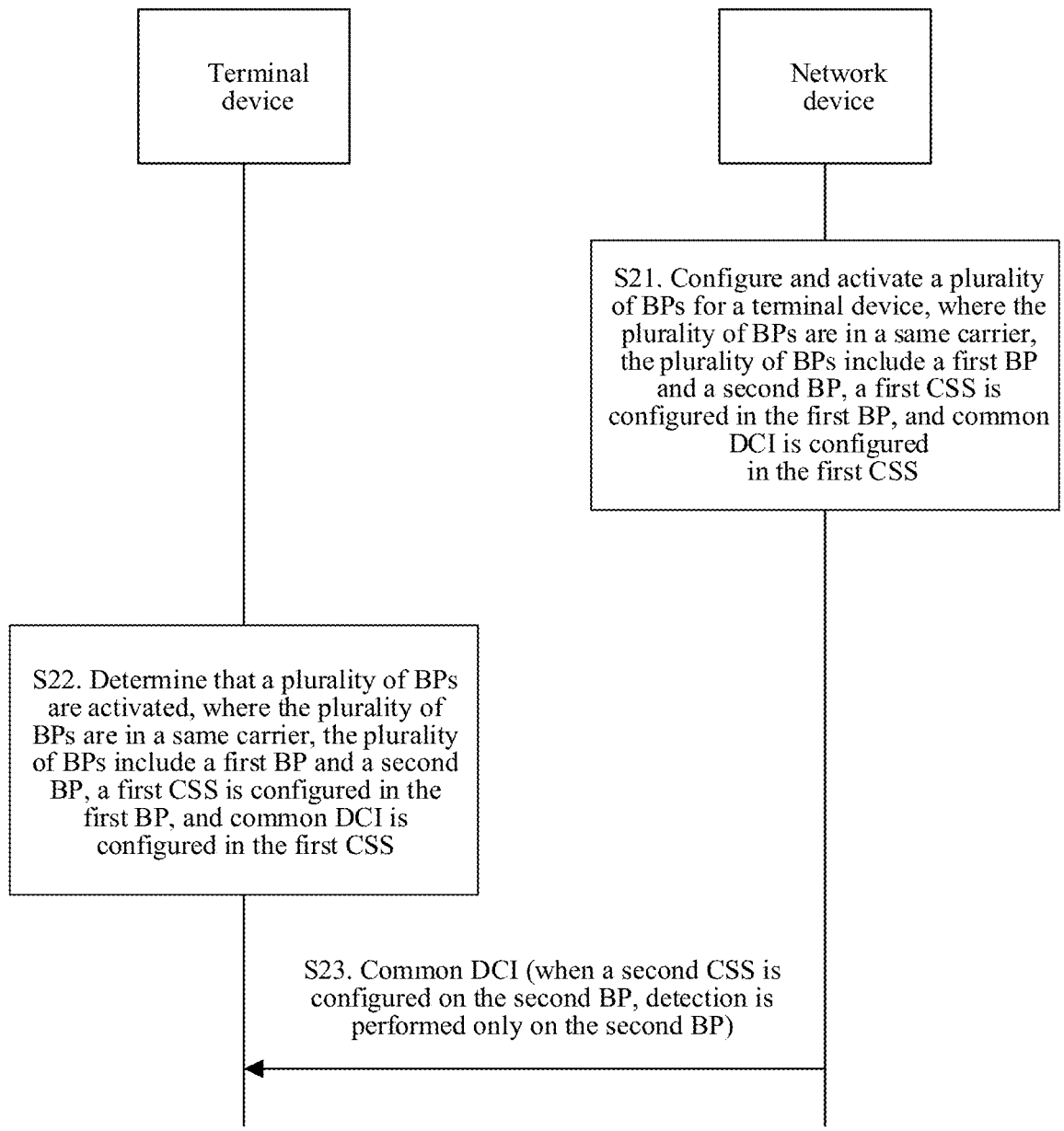
FIG. 2 is a schematic diagram of a communication method according to an embodiment of the present application.

FIG. 2 shows a communication method according to an embodiment of the present application. Descriptions are provided below always by using an example in which the method provided in the embodiments of the present application is applied to the application scenario shown in FIG. 1.

S21. On a network device side: A network device configures and activates a plurality of BPs for a terminal device. The plurality of BPs are in a same carrier, the plurality of BPs include a first BP and a second BP, a CSS, for example, a first CSS, is configured in the first BP, and common DCI is configured in the first CSS.

S22. On a terminal device side: The terminal device determines that a plurality of BPs are activated. The plurality of BPs are in a same carrier, the plurality of BPs include a first BP and a second BP, a first CSS is configured in the first BP, and common DCI is configured in the first CSS.

In the embodiments of the present application, a quantity of BPs configured and activated by the network device for the terminal device is greater than or equal to 2. The network device may simultaneously allocate a plurality of BPs to the terminal device, for example, simultaneously allocate the first BP and the second BP to the terminal device, and the network device may simultaneously activate the first BP and the second BP. Alternatively, the network device may configure different BPs for the terminal device at different moments, for example, configure and activate the first BP for the terminal device at a first moment, configure and activate the second BP for the terminal device at a second moment, where the first moment may be before or after the second moment.

In a situation, the first BP may be a BP allocated by the network device to the terminal device during initial access of the terminal device. For example, the network device may send a master information block (MIB) to the terminal device. After receiving the MIB, the terminal device may determine, based on the MIB, the first BP allocated by the network device to the terminal device. Alternatively, the terminal device may learn, based on the predefined information, the first BP allocated by the network device to the terminal device. For example, the terminal device determines a frequency domain resource of a synchronization signal through synchronization signal blind detection, and then determines a frequency domain resource of the first BP based on a predefined relationship. If the first BP is a BP allocated by the network device to the terminal device during initial access of the terminal device, the first BP may be activated by default.

In another situation, the first BP may be a BP allocated by the network device to the terminal device after the terminal device accesses a network. For example, the network device may send a system information block (SIB) to the terminal device. After receiving the SIB, the terminal device may determine, based on the SIB, the first BP allocated by the network device to the terminal device. Alternatively, the network device may send Radio Resource Control (RRC) signaling to the terminal device. After receiving the RRC signaling, the terminal device may know, based on the RRC signaling, the first BP allocated by the network device to the terminal device. Alternatively, the network device may indicate, by using other signaling, the first BP allocated to the terminal device, for example, indicate, by using dynamic signaling, the first BP allocated to the terminal device, where the dynamic signaling is, for example, common DCI or specific DCI of the terminal device. How the network device indicates the allocated first BP is not limited in the embodiments of the present application. In this case, the network device may activate, by using common DCI, specific DCI of the terminal device, or higher layer signaling, the first BP allocated to the terminal device. The higher layer signaling is, for example, SIB, RRC signaling, or a media access control (MAC) control element (CE).

The first BP includes a control resource set (CORESET). The CORESET includes the first CSS, a numerology corresponding to a resource in the first CSS is the same as a numerology corresponding to the first BP, and the first CSS may be used to schedule a SIB. Certainly, another resource may further be configured in the first BP. This is not limited in the embodiments of the present application. The numerology includes at least one of a subcarrier spacing and a type of a CP.

If the first BP is in an activated state, the terminal device can use the first BP. Because the common DCI is configured in the first CSS, the terminal device may receive, in the first CSS in the first BP that is in the activated state, the common DCI sent by the network device. In addition, the terminal device may further send and receive data in the first BP that is in the activated state, and so on.

S23. If a second CSS is configured in the second BP, a numerology corresponding to a resource in the second CSS is the same as a numerology corresponding to the second BP. In this case, the terminal device detects common DCI only in the second CSS in which the common DCI is configured. Certainly, another resource different from the second CSS may further be configured in the second BP. This is not limited in the embodiments of the present application.

In the embodiments of the present application, the second BP may be a BP allocated by the network device to the terminal device after the terminal device accesses the network. When the first BP allocated by the network device to the terminal device is used by the terminal device for initial access, a bandwidth of the first BP may be relatively small. If all terminal devices can still work in the first BP after accessing the network, scheduling congestion in the first BP may be caused. Consequently, some terminal devices do not have sufficient available resources. For example, when a relatively high transmission throughput needs to be obtained for a service performed by a terminal device, resources may be insufficient. Therefore, after the terminal device accesses a network, the network device may further re-allocate a BP to the terminal device based on a bandwidth capability of the terminal device, for example, allocate the second BP, so that the terminal device can better operate. Alternatively, when a type of a to-be-transmitted service of the terminal device changes, the network device may further re-allocate a BP to the terminal device, for example, allocate the second BP, so as to match a service type requirement of the terminal device. Alternatively, when needing to implement system load balance, the network device may further re-allocate a BP to the terminal device, for example, allocate the second BP, to effectively improve system resource utilization.

In the embodiments of the present application, the first BP and the second BP may be in a same carrier. For example, the network device may send a SIB to the terminal device. After receiving the SIB, the terminal device may determine, based on the SIB, the second BP allocated by the network device to the terminal device. Alternatively, the network device may send RRC signaling to the terminal device. After receiving the RRC signaling, the terminal device may know, based on the RRC signaling, the second BP allocated by the network device to the terminal device. Alternatively, the network device may indicate, by using other signaling, the second BP allocated to the terminal device, for example, indicate, by using the common DCI or the specific DCI of the terminal device, the second BP allocated to the terminal device. Alternatively, the network device may allocate the second BP to the terminal device through predefinition. In this case, the terminal device can determine, based on the predefined information, the second BP allocated by the network device to the terminal device. How the network device indicates the allocated second BP is not limited in the embodiments of the present application. In this case, the network device may activate, by using common DCI, specific DCI of the terminal device, or higher layer signaling, the second BP allocated to the terminal device. The higher layer signaling is, for example, SIB, RRC signaling, or a MAC CE.

If the second CSS is configured in the second BP, and the common DCI is configured in the second CSS, even though the first CSS is configured in the first BP, the terminal device detects the common DCI only in the second CSS. That is, when the network device configures and activates a plurality of BPs for the terminal device, and at least two CSSs are configured in the plurality of BPs, the terminal device selects only one of the CSSs to detect the common DCI, thereby avoiding an increase in a quantity of blind detections of the terminal device.

In an implementation, the network device may indicate, a CSS on which the terminal device detects the common DCI. For example, the network device sends first indication information to the terminal device when the network device configures the second CSS for the second BP, where the first indication information is used to instruct the terminal device to detect the common DCI only in the second CSS. After receiving the first indication information, the terminal device can determine that the common DCI is detected only in the second CSS. Certainly, the common DCI is configured in the second CSS. The first indication information may be carried in higher layer signaling, for example, SIB or RRC signaling. The first indication information is, for example, an identifier of the second BP or the second CSS, or an index of the second BP or the second CSS. Alternatively, the first indication information may occupy one or more bits, and values of the bits correspond to a CSS for detecting the common DCI. An implementation form of the first indication information is not limited in the embodiments of the present application.

In addition, it should be noted that, that the terminal device detects the common DCI only in the second CSS means that if there are a plurality of CSSs, the terminal device detects the common DCI only in one of the CSSs, and the terminal device can still use other CSSs. For example, the terminal device may further detect other information in the first CSS, and in addition to the common DCI, may further detect other information in the second CSS. It is not that the terminal device can only detect the common DCI in the second CSS without detecting other information.

S21 and S22 are described by using an example in which the network device configures the CSS for the second BP and the network device configures the common DCI in the second CSS, that is, the network device sends the common DCI in the second CSS. Therefore, the terminal device can directly detect the common DCI in the second CSS, and the terminal device may no longer receive the common DCI in the first CSS. In this manner, power consumption of the terminal device is not increased because the quantity of blind detections of the terminal device is not increased. Certainly, in this manner, the common DCI is not received in the first CSS. However, other resources in the first BP and/or in the first CSS can still be used, thereby enabling the terminal device to obtain more available resources while reducing system overheads.

In an optional manner, if the CSS is configured in the second BP, and the common DCI is configured in the second CSS, the terminal device may alternatively choose to deactivate the first BP. The deactivating the BP means that the terminal device no longer uses the BP, and does not detect any control information or transmit and receive data on the BP, that is, stops using all resources in the BP. In other words, if the second CSS is configured in the second BP, and the common DCI is configured in the second CSS, the second BP is sufficient for supporting operation of the terminal device, and the terminal device may deactivate the first BP, that is, no longer use the first BP. In this manner, resources can be effectively saved.

The foregoing describes the case in which the CSS is configured in the second BP, if a CSS is not configured in the second BP, and a CSS is configured in the first BP, the network device still sends the common DCI in the first CSS. In this case, the terminal device still needs to receive the common DCI in the first CSS. In other words, the network device configures at least one CSS for the terminal device. If only one CSS is configured, the terminal device receives the common DCI in the CSS. If a plurality of CSSs are configured for the terminal device, the terminal device receives the common DCI on a CSS configured on one BP, without receiving the common DCI in all of the plurality of CSSs. In this manner, system overheads are reduced, and power consumption of the terminal device is reduced.

In addition to the common DCI, the terminal device further needs to detect specific DCI of the terminal device. The specific DCI of the terminal device is DCI sent to a specific terminal device. The terminal device may detect the specific DCI of the terminal device in a CSS and a user-equipment-specific search space (USS).

In the embodiments of the present application, a first USS is configured in the first BP, a numerology corresponding to a resource in the first USS is the same as the numerology corresponding to the first BP, and the specific DCI of the terminal device is configured in the first USS.

In an example, the terminal device can simultaneously monitor the first BP and the second BP, that is, a total bandwidth of the first BP and the second BP is not greater than a maximum bandwidth capability of the terminal device, and the terminal device can simultaneously support the numerology corresponding to the first BP and the numerology corresponding to the second BP. In this case, when the first BP and the second BP correspond to a same numerology, if a second USS is not configured in the second BP, the terminal device directly detects the first USS in the first BP. The specific DCI of the terminal device is configured in the first USS, and the specific DCI of the terminal device is used to indicate that the terminal device performs data transmission specific to the terminal device in the first BP and/or the second BP.

In another example, the terminal device can simultaneously monitor the first BP and the second BP, that is, a total bandwidth of the first BP and the second BP is not greater than a maximum bandwidth capability of the terminal device, and the terminal device can simultaneously support the numerology corresponding to the first BP and the numerology corresponding to the second BP. In this case, when the first BP and the second BP correspond to a same numerology, if a second USS is configured in the second BP, a numerology corresponding to a resource in the second USS is the same as the numerology corresponding to the second BP, and the terminal device detects first specific DCI of the terminal device in the first BP, and detects second specific DCI of the terminal device in the second BP. The first specific DCI and/or the second specific DCI of the terminal device is used to indicate that the terminal device performs data transmission specific to the terminal device in the first BP and/or the second BP. Alternatively, the terminal device receives indication information sent by the network device, and determines to detect the specific DCI of the terminal device in the first BP and/or the second BP. The indication information may be carried in higher layer signaling, for example, SIB or RRC signaling. Alternatively, the indication information may be carried in dynamic signaling, for example, the common DCI or the specific DCI of the terminal device. The indication information is, for example, an identifier of the first BP and/or the second BP, an identifier of the first CSS/the second CSS, an index of the first BP and/or the second BP, or an index of the first CSS and/or the second CSS. Alternatively, the indication information may occupy one or more bits, and values of the bits correspond to a CSS for detecting the common DCI. An implementation form of the indication information is not limited in the embodiments of the present application.

In another example, the terminal device can simultaneously monitor the first BP and the second BP, that is, a total bandwidth of the first BP and the second BP is not greater than a maximum bandwidth capability of the terminal device, and the terminal device can simultaneously support the numerology corresponding to the first BP and the numerology corresponding to the second BP. In this case, when the first BP and the second BP correspond to different numerologies, if a second USS is configured in the second BP, a numerology corresponding to a resource in the second USS is the same as the numerology corresponding to the second BP, and the terminal device detects first specific DCI of the terminal device in the first BP, and detects second specific DCI of the terminal device in the second BP. The first specific DCI of the terminal device is used to indicate that the terminal device performs data transmission specific to the terminal device in the first BP, and the second specific DCI of the terminal device is used to indicate that the terminal device performs data transmission specific to the terminal device in the second BP.

In the foregoing three examples, that a total bandwidth of the first BP and the second BP is not greater than a maximum bandwidth capability of the terminal device may be described as: a difference between a maximum value of a highest frequency of the first BP and a highest frequency of the second BP and a minimum value of a lowest frequency of the first BP and a lowest frequency of the second BP is not greater than a maximum bandwidth that can be supported by the terminal device. That the first BP and the second BP correspond to a same numerology may be described as: the first BP and the second BP correspond to a same subcarrier spacing, and the first BP and the second BP correspond to a same CP type. That the first BP and the second BP correspond to different numerologies may be described as: the first BP and the second BP correspond to different subcarrier spacings, and/or the first BP and the second BP correspond to different CP types.

In the embodiments of the present application, if the terminal device cannot simultaneously monitor the first BP and the second BP, that is, the total bandwidth of the first BP and the second BP is greater than the maximum bandwidth capability of the terminal device, or the terminal device cannot simultaneously support the numerology corresponding to the first BP and the numerology corresponding to the second BP, the second USS is configured in the second BP, and the numerology corresponding to the resource in the second USS is the same as the numerology corresponding to the second BP, the terminal device detects the second USS in the second BP. The specific DCI of the terminal device is configured in the second USS, and the specific DCI of the terminal device is used to indicate that the terminal device performs data transmission specific to the terminal device in the second BP. In addition, if the second CSS is configured in the second BP, the terminal device may further deactivate the first BP. That is, the terminal device does not detect the first CSS and the first USS in the first BP. If no second CSS is configured in the second BP, the terminal device cannot deactivate the first BP. That is, the terminal device needs to detect the first CSS and the first USS in the first BP.

In addition, if the terminal device cannot simultaneously monitor the first BP and the second BP, and no second CSS is configured in the second BP, the network device may send, within a first transmission time unit, the common DCI in the CSS configured in the first BP, and the terminal device may detect, within the first transmission time unit, the common DCI in the CSS configured in the first BP. In addition, the network device may send, within a second transmission time unit, the specific DCI of the terminal device in the USS configured in the second BP. If the terminal device further needs to detect the specific DCI of the terminal device, the terminal device may detect, within the second transmission time unit, the specific DCI of the terminal device in the USS configured in the second BP. Moreover, in addition to sending the common DCI in the first CSS, the network device may further send the specific DCI of the terminal device in the CSS configured in the first BP, and the terminal device may further detect, within the first transmission time unit, the specific DCI of the terminal device in the CSS configured in the first BP. The first transmission time unit is different from the second transmission time unit, and in a time sequence, the first transmission time unit may be before or after the second transmission time unit. In the embodiments of the present application, the transmission time unit is, for example, a subframe, a slot, or a mini-slot, slot aggregation, mini-slot aggregation, or the like.

In the foregoing embodiment, that a total bandwidth of the first BP and the second BP is greater than a maximum bandwidth capability of the terminal device may be described as: a difference between a maximum value of a highest frequency of the first BP and a highest frequency of the second BP and a minimum value of a lowest frequency of the first BP and a lowest frequency of the second BP is greater than a maximum bandwidth that can be supported by the terminal device.

Moreover, in addition to detecting the common DCI and the specific DCI of the terminal device, the terminal device further receives a measurement reference signal. A specific BP on which the terminal device receives the measurement reference signal is related to a configuration between the first BP and the second BP. The measurement reference signal is, for example, a channel state information-reference signal (CSI-RS), or may be another signal.

In the embodiments of the present application, if the terminal device can simultaneously monitor the first BP and the second BP, that is, the total bandwidth of the first BP and the second BP is not greater than the maximum bandwidth capability of the terminal device, and the terminal device can simultaneously support the numerology corresponding to the first BP and the numerology corresponding to the second BP, the terminal device receives a measurement reference signal on both the first BP and the second BP, or the terminal device receives indication information sent by the network device, and determines to receive a measurement reference signal in the first BP and/or the second BP.

For example, when a CSS is not configured on other BPs than the first BP in the plurality of BPs, the network device may send second indication information to the terminal device, where the second indication information is used to instruct the terminal device to detect a measurement reference signal in the second BP. The terminal device may receive the measurement reference signal in the second BP after receiving the second indication information. The second indication information may be carried in higher layer signaling, for example, SIB, RRC signaling, or a MAC CE. Alternatively, the second indication information may be carried in dynamic signaling, for example, the common DCI or the specific DCI of the terminal device. The second indication information is, for example, an identifier of the first BP and/or the second BP, or an index of the first BP and/or the second BP. Alternatively, the second indication information may occupy one or more bits, and values of the bits correspond to a CSS for detecting the common DCI. An implementation form of the second indication information is not limited in the embodiments of the present application.

Alternatively, for example, when a CSS, namely, the second CSS, is configured in the second BP, the network device may send third indication information to the terminal device, where the third indication information is used to instruct the terminal device to detect a measurement reference signal in the second BP. The terminal device may receive the measurement reference signal in the second BP after receiving the third indication information. The third indication information may be carried in higher layer signaling, for example, SIB, RRC signaling, or a MAC CE. Alternatively, the third indication information may be carried in dynamic signaling, for example, the common DCI or the specific DCI of the terminal device. The third indication information is, for example, an identifier of the first BP and/or the second BP, or an index of the first BP and/or the second BP. Alternatively, the third indication information may occupy one or more bits, and values of the bits correspond to a CSS for detecting the common DCI. An implementation form of the third indication information is not limited in the embodiments of the present application.

Figure 3:
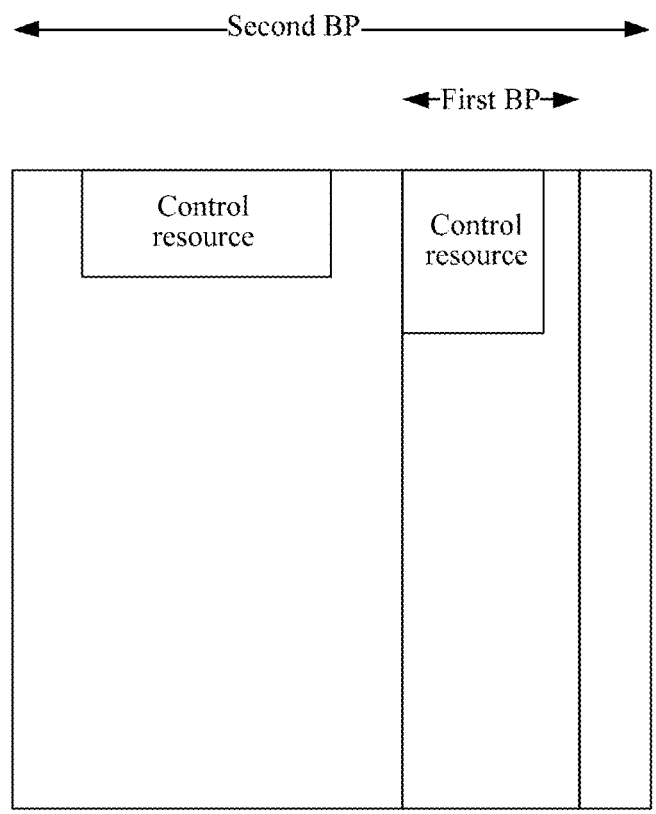
FIG. 3 is a schematic diagram illustrating that a first BP is included in a second BP according to an embodiment of the present application.

In some embodiments of the present application, the first BP and the second BP allocated to the terminal device may have different configurations. For example, a configuration is that the first BP is included in the second BP. As shown in FIG. 3, if a numerology corresponding to a measurement reference signal in the first BP is the same as a numerology corresponding to a measurement reference signal in the second BP, the terminal device only needs to receive the measurement reference signal in the second BP. This is, because either the terminal device or the network device can deduce a measurement result in the first BP based on a measurement result in the second BP. In this manner, energy conservation of the terminal device is further implemented, so that the terminal device does not need to receive the measurement reference signal on a plurality of BPs. If a numerology corresponding to a measurement reference signal in the first BP is different from a numerology corresponding to a measurement reference signal in the second BP, the terminal device needs to receive a measurement reference signal on both the first BP and the second BP. This is because neither the terminal device nor the network device can deduce a measurement result in the first BP based on a measurement result in the second BP.

In the embodiments of the present application, if the terminal device cannot simultaneously monitor the first BP and the second BP, that is, the total bandwidth of the first BP and the second BP is greater than the maximum bandwidth capability of the terminal device, or the terminal device cannot simultaneously support the numerology corresponding to the first BP and the numerology corresponding to the second BP, the terminal device receives a measurement reference signal in the second BP. In addition, if the second CSS is configured in the second BP, the terminal device may further deactivate the first BP. That is, the terminal device does not receive the measurement reference signal in the first BP. If no second CSS is configured in the second BP, the terminal device cannot deactivate the first BP. That is, the terminal device needs to receive the measurement reference signal in the first BP.

In the embodiments of the present application, the terminal device can detect the common DCI only in one CSS, with no need to detect the common DCI in all CSSs configured in the plurality of BPs. This can avoid an increase in the quantity of blind detections of the terminal device and an increase in power consumption of the terminal device.

The following describes an apparatus corresponding to each method embodiment with reference to the accompanying drawings.

Figure 4:
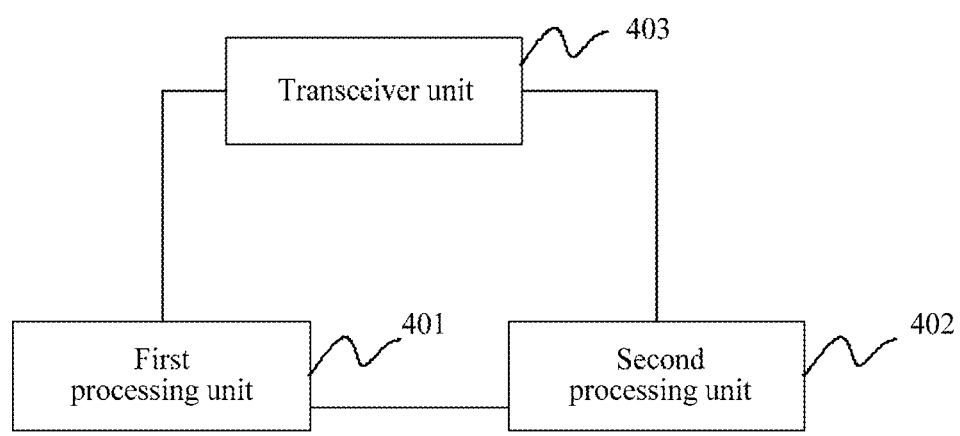
FIG. 4 is a schematic structural diagram of a terminal device according to an embodiment of the present application.

FIG. 4 is a schematic diagram of a terminal device 400 according to an embodiment of the present application. The terminal device 400 may be applied to the scenario shown in FIG. 1, and configured to perform the method shown in FIG. 2. As shown in FIG. 4, the terminal device 400 includes a first processing unit 401 and a second processing unit 402. The terminal device 400 may further include a transceiver unit 403. The transceiver unit 403 may be specifically configured to perform various information sending and receiving performed by the terminal device in the embodiment shown in FIG. 2. The first processing unit 401 and the second processing unit 402 are specifically configured to perform other processing that is different from the information sending and receiving and that is performed by the terminal device in the embodiment shown in FIG. 2. The first processing unit 401 and the second processing unit 402 may be a same functional component, or may be different functional components.

For example, the first processing unit 401 is configured to determine that a plurality of BPs are activated, where the plurality of BPs are in a same carrier, the plurality of BPs include a first BP and a second BP, a first CSS is configured in the first BP, and common DCI is configured in the first CSS. The second processing unit 402 is configured to detect the common DCI only in a second CSS when the second CSS is configured in the second BP, where the common DCI is configured in the second CSS.

For specific content, refer to specific descriptions in the embodiment shown in FIG. 2, and details are not described herein again.

Figure 5:
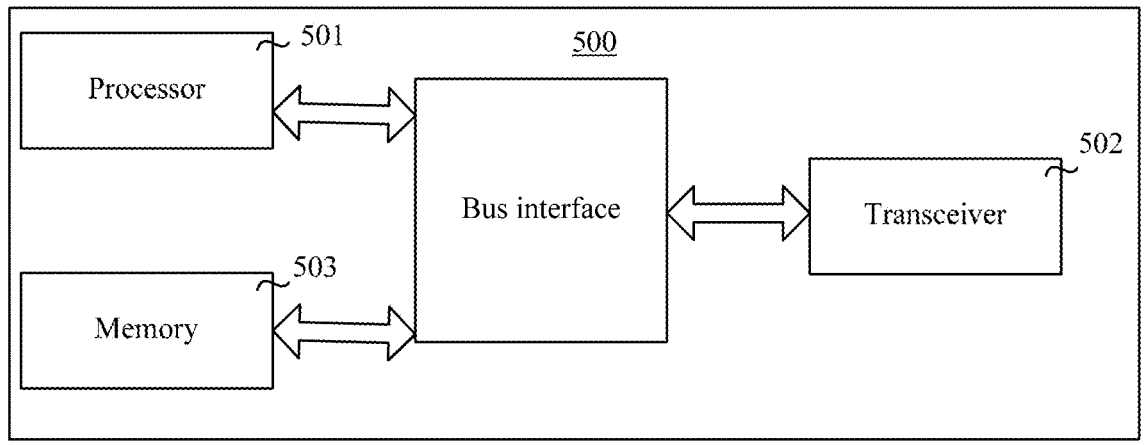
FIG. 5 is a schematic structural diagram of another terminal device according to another embodiment of the present application.

It should be understood that division of the foregoing units is merely logical function division. In actual implementation, all or some of units may be integrated into a physical entity, or may be physically separated. In the embodiments of the present application, the transceiver unit 403 may be implemented by at least one transceiver, and the first processing unit 401 and the second processing unit 402 may be implemented by at least one processor. As shown in FIG. 5, a terminal device 500 may include a processor 501, a transceiver 502, and a memory 503. The memory 503 may be configured to store a program/code pre-installed when the terminal device 500 is delivered from a factory, or may store code executed by the processor 501, or the like.

It should be understood that, the terminal device 500 according to this embodiment of the present application may correspond to the terminal device in the embodiment shown in FIG. 2 according to the embodiments of the present application. The transceiver 502 is configured to perform various information sending and receiving performed by the terminal device in the embodiment shown in FIG. 2, and the processor 501 is configured to perform other processing that is different from the information sending and receiving and that is performed by the terminal device in the embodiment shown in FIG. 2.

Figure 6:
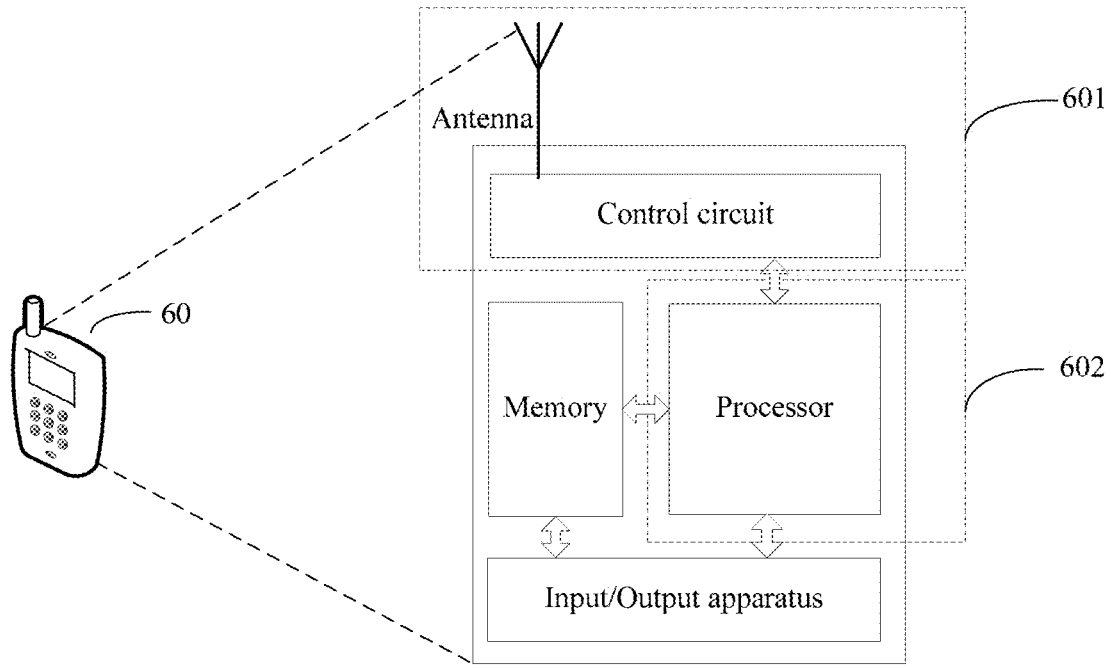
FIG. 6 is a schematic structural diagram of another terminal device according to another embodiment of the present application.

FIG. 6 is a schematic structural diagram of a terminal device 60. The terminal device 60 may be applied to the scenario shown in FIG. 1, and perform the method according to the embodiment shown in FIG. 2. For ease of description, FIG. 6 shows only main components of the terminal device 60. As shown in FIG. 6, a terminal device 60 includes a processor, a memory, a control circuit, an antenna, and an input/output apparatus. The control circuit is mainly configured to convert a baseband signal and a radio frequency signal and process a radio frequency signal. The control circuit and the antenna together may be referred to as a transceiver, and are mainly configured to: send and receive a radio frequency signal in an electromagnetic wave form, receive a signaling indication and/or a reference signal sent by a base station, and is configured to perform various information sending and receiving performed by the terminal device in the embodiment shown in FIG. 2. For details, refer to descriptions of the foregoing related part. The processor is mainly configured to: process a communication protocol and communications data, control an entire terminal device, execute a software program, and process data of the software program, for example, configured to support the terminal device in performing an action other than the information sending and receiving in the embodiment shown in FIG. 2. The memory is mainly configured to store the software program and data. The input/output apparatus, such as a touchscreen, a display screen, or a keyboard, is mainly configured to receive data entered by a user and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 6 shows only one memory and one processor. In actual user equipment, a plurality of processors and memories may exist. The memory may also be referred to as a storage medium, a storage device, or the like. This is not limited in the embodiments of the present application.

In an optional implementation, the processor may include a baseband processor and a central processing unit. The baseband processor is mainly configured to process a communication protocol and communications data, and the central processing unit is mainly configured to: control the entire terminal device, execute a software program, and process data of the software program. Functions of the baseband processor and the central processing unit can be integrated into the processor in FIG. 6. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing a communication protocol and communications data may be built into the processor, or may be stored in a storage unit in a form of a software program, so that the processor executes the software program to implement a baseband processing function.

For example, in the embodiments of the present application, the antenna and the control circuit that have receiving and sending functions may be considered as a transceiver unit 601 of the terminal device 60, and the processor having a processing function may be considered as a processing unit 602 of the terminal device 60. As shown in FIG. 6, the terminal device 60 includes the transceiver unit 601 and the processing unit 602. The transceiver unit 601 may also be referred to as a transceiver, a transceiver apparatus, or the like. Optionally, a component that is in the transceiver unit 601 and that is configured to implement a receiving function may be considered as a receiving unit, and a component that is in the transceiver unit 601 and that is configured to implement a sending function may be considered as a sending unit. That is, the transceiver unit 601 includes the receiving unit and the sending unit. For example, the receiving unit may also be referred to as a receiver, a receiver circuit, or the like, and the sending unit may also be referred to as a transmitter, a transmitter circuit, or the like.

The transceiver in the embodiments of the present application may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random access memory (RAM). Alternatively, the memory may include a non-volatile memory, for example, a read-only memory (ROM), a flash memory, a hard disk drive (HDD), or a solid-state drive (SSD). Alternatively, the memory may include a combination of the foregoing types of memories.

Figure 7:
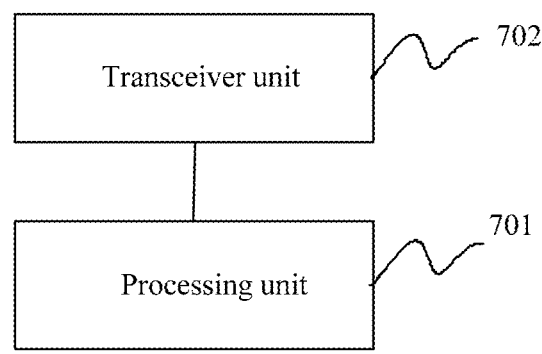
FIG. 7 is a schematic structural diagram of a network device according to an embodiment of the present application.

FIG. 7 is a schematic diagram of a network device according to an embodiment of the present application. The network device may be applied to the scenario shown in FIG. 1, and configured to perform the method in the embodiment shown in FIG. 2. As shown in FIG. 7, the network device includes a processing unit 701 and a transceiver unit 702. The transceiver unit 702 may be specifically configured to perform various information sending and receiving performed by the network device in the embodiment shown in FIG. 2. The processing unit 701 is specifically configured to perform other processing that is different from the information sending and receiving and that is performed by the network device in the embodiment shown in FIG. 2.

For example, the processing unit 701 may be configured to configure and activate a plurality of BPs for a terminal device, where the plurality of BPs are in a same carrier, the plurality of BPs include a first BP and a second BP, a first CSS is configured in the first BP, common DCI is configured in the first CSS, a second CSS is configured in the second BP, and the common DCI is configured in the second CSS. The transceiver unit 702 may be configured to send first indication information to the terminal device, where the first indication information is used to instruct the terminal device to detect the common DCI only in the second CSS.

For specific content, refer to descriptions of the related part in the embodiment shown in FIG. 2.

Figure 8:
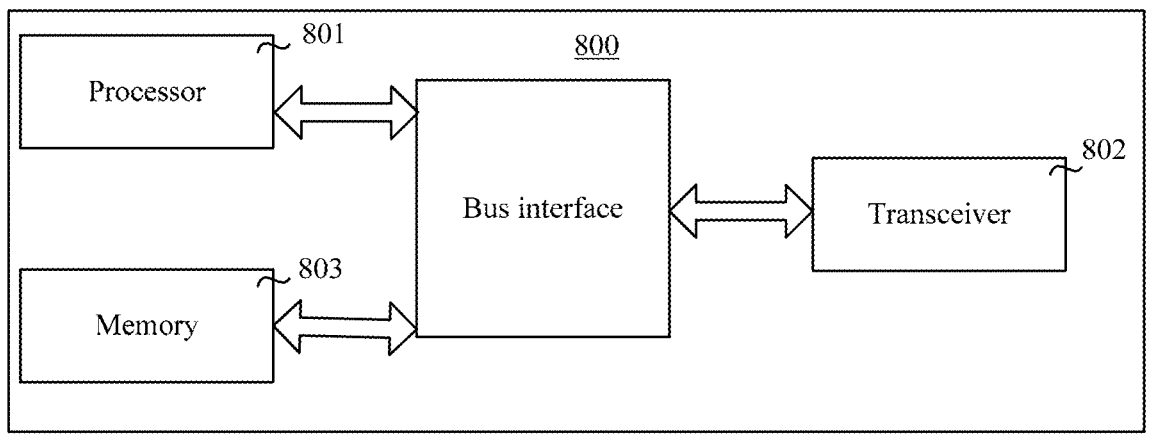
FIG. 8 is a schematic structural diagram of another network device according to an embodiment of the present application.

It should be understood that division of the foregoing units is merely logical function division. In actual implementation, all or some of units may be integrated into a physical entity, or may be physically separated. In the embodiments of the present application, the transceiver unit 702 may be implemented by at least one transceiver, and the processing unit 701 may be implemented by at least one processor. As shown in FIG. 8, a network device 800 may include a processor 801, a transceiver 802, and a memory 803. The memory 803 may be configured to store a program/code pre-installed when the network device 800 is delivered from a factory, or may store code executed by the processor 801, or the like.

It should be understood that, the network device 800 according to this embodiment of the present application may correspond to the network device in the embodiment shown in FIG. 2 according to the embodiments of the present application. The transceiver 802 is configured to perform various information sending and receiving performed by the network device in the embodiment shown in FIG. 2, and the processor 801 is configured to perform other processing that is different from the information sending and receiving and that is performed by the network device in the embodiment shown in FIG. 2.

Figure 9:
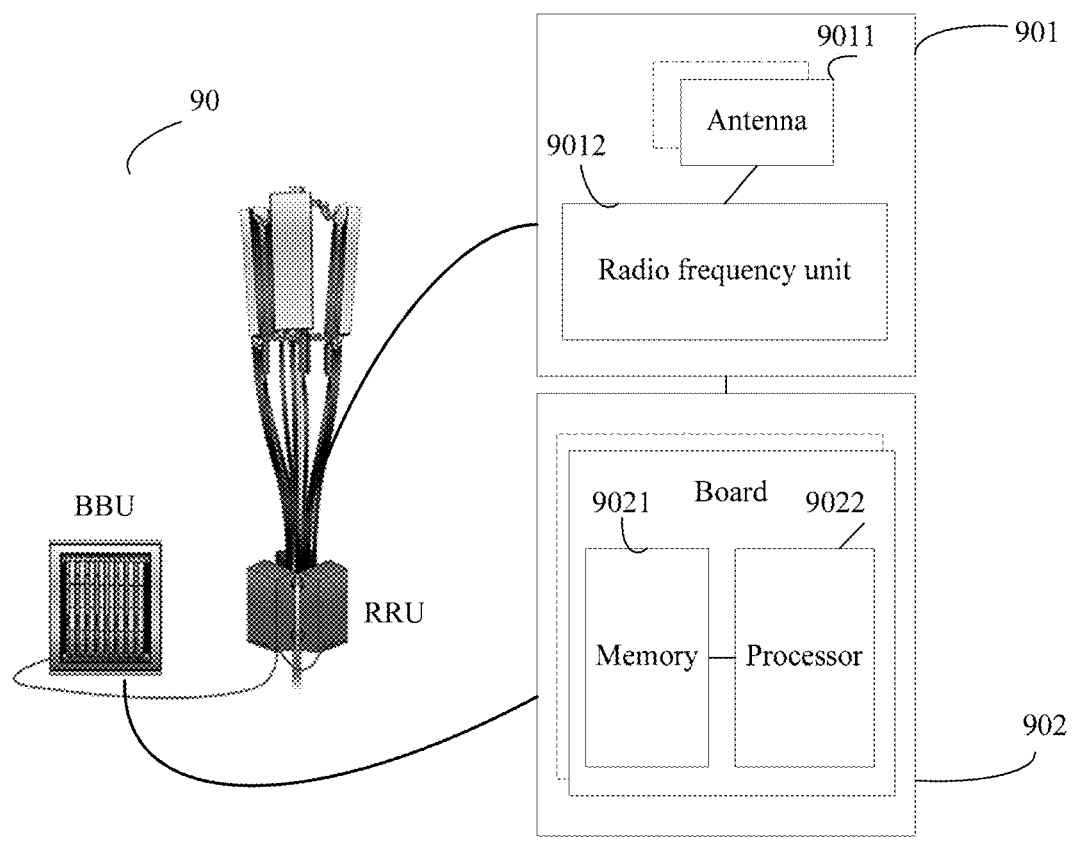
FIG. 9 is a schematic structural diagram of another network device according to an embodiment of the present application.

FIG. 9 is a schematic structural diagram of a network device 90. The network device 90 may be, for example, a base station. The network device 90 may be applied to the system shown in FIG. 1, and configured to perform the method in the embodiment shown in FIG. 2. The network device 90 includes one or more remote radio units (RRU) 901 and one or more baseband units (BBU) 902. The RRU 901 may be referred to as a transceiver unit, a transceiver, a transceiver circuit, or the like, and may include at least one antenna 9011 and a radio frequency unit 9012. The RRU 901 is mainly configured to send and receive a radio frequency signal and convert a radio frequency signal and a baseband signal (e.g., configured to perform various information sending and receiving performed by the network device in the embodiment shown in FIG. 2). The BBU 902 is mainly configured to perform baseband processing, control the network device, and the like. The RRU 901 and the BBU 902 may be physically disposed together, or may be physically separated, for example, a distributed base station.

The BBU 902 is a control center of the network device, may also be referred to as a processing unit, and is mainly configured to complete a baseband processing function, such as channel encoding, multiplexing, modulation, and spreading. For example, the BBU (e.g., the processing unit) may be configured to control the network device to perform other processing that is different from the information sending and receiving in the embodiment shown in FIG. 2.

In an example, the BBU 902 may include one or more boards, where a plurality of boards may commonly support a radio access network (for example, an LTE network) of a single access standard, or may respectively support radio access networks of different standards. The BBU 902 further includes a memory 9021 and a processor 9022. The memory 9021 is configured to store a necessary instruction and data. The processor 9022 is configured to control the network device to perform a necessary action (e.g., configured to control the network device to perform other processing that is different from the information sending and receiving in the embodiment shown in FIG. 2). The memory 9021 and the processor 9022 may serve one or more boards. In other words, a memory 9021 and a processor 9022 may be separately disposed on each board. Alternatively, a plurality of boards may use a same memory 9021 and processor 9022. In addition, a necessary circuit is further disposed on each board.

In FIG. 5 and FIG. 8, a bus interface may further be included. The bus interface may include any quantity of interconnected buses and bridges. Specifically, the bus interface links together various circuits of one or more processors represented by the processor and memories represented by the memory. The bus interface may further link together various other circuits such as a peripheral device, a voltage regulator, and a power management circuit. This is well known in the art, and therefore is not further described in this specification. The bus interface provides an interface. The transceiver provides a unit for communicating with various other devices on a transmission medium. The processor is responsible for managing a bus architecture and general processing. The memory may store data used when the processor performs an operation.

A person skilled in the art may further understand that various illustrative logical blocks (illustrative logic block) and steps (step) that are listed in the embodiments of the present application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be understood that the implementation goes beyond the protection scope of the embodiments of the present application.

Functions of various logic units and circuits described in the embodiments of the present application may be implemented or performed by using a design of a general-purpose processor, a digital signal processor, an application-specific integrated circuit (ASIC), a field-programmable gate array (FPGA) or another programmable logic device, discrete gate or transistor logic device, discrete hardware component, or any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors together with a digital signal processor core, or any other similar configuration.

Steps of the methods or algorithms described in the embodiments of the present application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor, so that the processor may read information from the storage medium and write information to the storage medium. Optionally, the storage medium may be integrated into the processor. The processor and the storage medium may be arranged in an ASIC, and the ASIC may be arranged in UE. Optionally, the processor and the storage medium may be arranged in different components of the UE.

It should be understood that sequence numbers of the processes do not mean execution sequences in various embodiments of this application. The execution sequences of the processes should be determined based on functions and internal logic of the processes, and should not constitute any limitation on the implementation processes of the embodiments of the present application.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

The embodiments in this specification are all described in a progressive manner, for same or similar parts in the embodiments, refer to these embodiments, and each embodiment focuses on a difference from other embodiments. In particular, apparatus and system embodiments are basically similar to a method embodiment, and therefore are described briefly; for related parts, refer to partial descriptions in the method embodiment.

The foregoing descriptions of this specification in this application may enable a person skilled in the art to use or implement the content of this application. It should be considered that any modification made based on the disclosed content is obvious in the art. The basic principles described in this application may be applied to other variations without departing from the essence and scope of this application. Therefore, the content disclosed in this application is not limited to the described embodiments and designs, but may further be extended to a maximum scope that is consistent with the principles of this application and new features disclosed in this application.

What is claimed is:

1. A communication method, comprising:
   determining, by a terminal device, that a plurality of bandwidth parts (BPs) are activated, wherein
   the plurality of BPs are in a same carrier,
   the plurality of BPs comprise a first bandwidth part (BP) and a second BP,
   a first common search space (CSS) is configured in the first BP,
   common downlink control information (DCI) is configured in the first CSS; and
   detecting, by the terminal device, the common DCI only in a second CSS when the second CSS is configured in the second BP, wherein the common DCI is configured in the second CSS; and
   when a CSS is not configured on other BPs than the first BP in the plurality of BPs:
   detecting, by the terminal device, the common DCI in the first CSS; and
   receiving a measurement reference signal in the second BP.

2. The communication method according to claim 1, further comprising:
   when the second CSS is configured in the second BP, receiving, by the terminal device, first indication information from a network device, wherein the first indication information is used to instruct the terminal device to detect the common DCI in the second CSS.

3. The communication method according to claim 1, further comprising:
   receiving, by the terminal device, a master information block (MIB) from a network device, and determining, by the terminal device based on the MIB, the first BP configured by the network device for the terminal device; or determining, by the terminal device based on predefined information, the first BP configured by the network device for the terminal device.

4. The communication method according to claim 1, further comprising:

receiving, by the terminal device, a system information block (SIB) from a network device, and determining, by the terminal device based on the SIB, the first BP or the second BP configured by the network device for the terminal device; or receiving, by the terminal device, radio resource control (RRC) signaling from the network device, and determining, by the terminal device based on the RRC signaling, the first BP or the second BP configured by the network device for the terminal device.

5. The communication method according to claim 1, wherein the common DCI comprises DCI used to schedule a system information block (SIB).

6. A communication method, comprising:

configuring and activating, by a network device, a plurality of bandwidth parts (BPs) for a terminal device, wherein the plurality of BPs are in a same carrier,
the plurality of BPs comprise a first bandwidth part (BP) and a second BP,
a first common search space (CSS) is configured in the first BP, and
common downlink control information (DCI) is configured in the first CSS;

sending, by the network device, first indication information to the terminal device when the network device configures a second CSS for the second BP, wherein the first indication information is used to instruct the terminal device to detect the common DCI only in the second CSS, and the common DCI is configured in the second CSS; and when a CSS is not configured on other BPs than the first BP in the plurality of BPs:
sending, by the network device, second indication information to the terminal device, wherein the second indication information is used to instruct the terminal device to receive a measurement reference signal in the second BP.

7. The communication method according to claim 6, further comprising:

sending, by the network device, a master information block (MIB) to the terminal device, wherein the MIB is used to indicate the first BP configured by the network device for the terminal device; or configuring, by the network device, the first BP for the terminal device based on predefined information.

8. The communication method according to claim 6, further comprising:

sending, by the network device, a system information block (SIB) to the terminal device, wherein the SIB is used to indicate the first BP or the second BP configured by the network device for the terminal device; or sending, by the network device, radio resource control (RRC) signaling to the terminal device, wherein the RRC signaling is used to indicate the first BP or the second BP configured by the network device for the terminal device.

9. The communication method according to claim 6, wherein the common DCI comprises DCI used to schedule a system information block (SIB).

10. A terminal device, comprising:
a processor;
a transceiver; and
a memory configured to store computer readable instructions that, when executed, cause the processor to:
determine that a plurality of bandwidth parts (BPs) are activated, wherein the plurality of BPs are in a same carrier,
the plurality of BPs comprise a first bandwidth part (BP) and a second BP,
a first common search space (CSS) is configured in the first BP, and common downlink control information (DCI) is configured in the first CSS; and
detect the common DCI only in a second CSS when the second CSS is configured in the second BP, wherein the common DCI is configured in the second CSS, and wherein the processor is further configured to detect the common DCI in the first CSS when a CSS is not configured on other BPs than the first BP in the plurality of BPs, and the transceiver is configured to receive a measurement reference signal in the second BP when the CSS is not configured on the other BPs than the first BP in the plurality of BPs.

11. The terminal device according to claim 10, wherein when the second CSS is configured in the second BP, the transceiver is configured to:

receive first indication information from a network device, wherein the first indication information is used to instruct the terminal device to detect the common DCI in the second CSS.

12. The terminal device according to claim 10, wherein the transceiver is configured to receive a master information block (MIB) from a network device, and the processor is further configured to determine, based on the MIB, the first BP configured by the network device for the terminal device; or the processor is further configured to determine, based on predefined information, the first BP configured by the network device for the terminal device.

13. The terminal device according to claim 10, wherein the transceiver is configured to receive a system information block (SIB) from a network device, and the processor is further configured to determine, based on the SIB, the first BP or the second BP configured by the network device for the terminal device; or the transceiver is configured to receive radio resource control (RRC) signaling from the network device, and the processor is further configured to determine, based on the RRC signaling, the first BP or the second BP configured by the network device for the terminal device.

14. The communication method according to claim 1, wherein the terminal device is further configured to detect additional information, other than the common DCI, in the first CSS, the second CSS, and additional CSSs when the second CSS is configured in the second BP.

15. The communication method according to claim 6, wherein the terminal device is further configured to detect additional information, other than the common DCI, in the first CSS, the second CSS, and additional CSSs when the second CSS is configured in the second BP.

16. The terminal device according to claim 10, wherein the terminal device is further configured to detect additional information, other than the common DCI, in the first CSS, the second CSS, and additional CSSs when the second CSS is configured in the second BP.

* * * * *